United States Patent
Neufang

(10) Patent No.: US 6,615,604 B2
(45) Date of Patent: Sep. 9, 2003

(54) ASSEMBLY OF A COMPONENT OF A VEHICLE AIR CONDITIONING SYSTEM TO A SUPPORT STRUCTURE

(75) Inventor: Hans George Neufang, Foehren (DE)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/214,401

(22) Filed: Aug. 7, 2002

(65) Prior Publication Data
US 2003/0046948 A1 Mar. 13, 2003

(30) Foreign Application Priority Data
Sep. 7, 2001 (LU) .................................................. 90827

(51) Int. Cl.⁷ .............................................. F25D 19/00
(52) U.S. Cl. .......................... 62/298; 165/67; 165/140
(58) Field of Search ..................... 62/298, 302; 165/67, 165/140; 180/68.4; 248/201, 229.26, 316.8

(56) References Cited

U.S. PATENT DOCUMENTS

| | | | | | |
|---|---|---|---|---|---|
| 4,564,168 A | * | 1/1986 | Ikuta et al. | .................. | 248/638 |
| 5,067,574 A | | 11/1991 | Attinger et al. | ............ | 180/68.4 |
| 5,899,263 A | * | 5/1999 | Tokutake | ..................... | 165/67 |
| 6,059,019 A | * | 5/2000 | Brost et al. | .................. | 165/67 |
| 6,155,335 A | * | 12/2000 | Acre et al. | ..................... | 165/41 |
| 6,230,793 B1 | * | 5/2001 | Sumida | ....................... | 165/140 |
| 6,305,465 B1 | * | 10/2001 | Uchikawa et al. | ........... | 165/140 |
| 6,328,100 B1 | * | 12/2001 | Haussmann | .................. | 165/176 |
| 6,357,519 B1 | * | 3/2002 | Ozaki et al. | ................. | 165/140 |
| 6,397,937 B1 | * | 6/2002 | Ghiani | ........................ | 165/140 |
| 6,422,302 B1 | * | 7/2002 | Hubert | ......................... | 165/67 |
| 6,446,711 B1 | * | 9/2002 | DeGroot et al. | ............ | 165/149 |

* cited by examiner

Primary Examiner—William E. Tapolcal
Assistant Examiner—Mohammad M. Ali
(74) Attorney, Agent, or Firm—Patrick M. Griffin

(57) ABSTRACT

An assembly (10) of a component (12) of a vehicle air conditioning system to a support structure (14), wherein the component (12) has a first connection element (32) and the support structure (14) has a second connection element (28). According to an important aspect of the invention, either the first or the second connection element (28) comprises a recess (30) therein for receiving the other connection element (28, 32) and a lateral opening (34) for allowing lateral introduction of the other connection element (28, 32) into the recess (30). The other connection element (28, 32) comprises a form having a section adapted to be received in the recess (30), the section having a dimension in a first direction which is smaller than the width of the lateral opening (34) and the section having a dimension in a second direction which is larger than the width of the lateral opening (34), such that, in a first position, the other connection element (28, 32) can be introduced into the recess (30) through the lateral opening (34) and that, after rotation into a second position of the other connection element (28, 32) within the recess (30), an interference fit connection is achieved between the first connection element (32) and the second connection element (28).

20 Claims, 3 Drawing Sheets

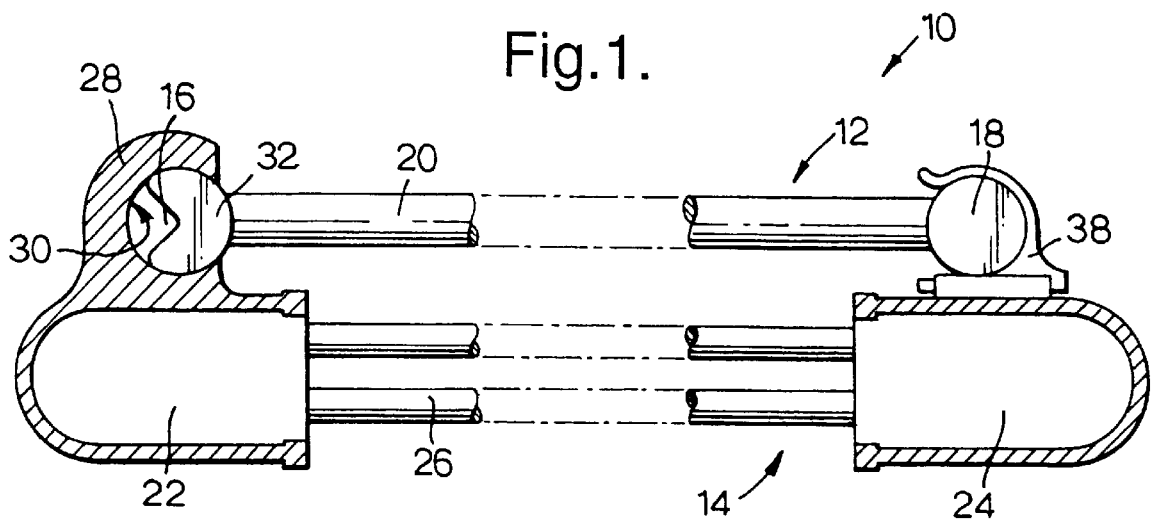
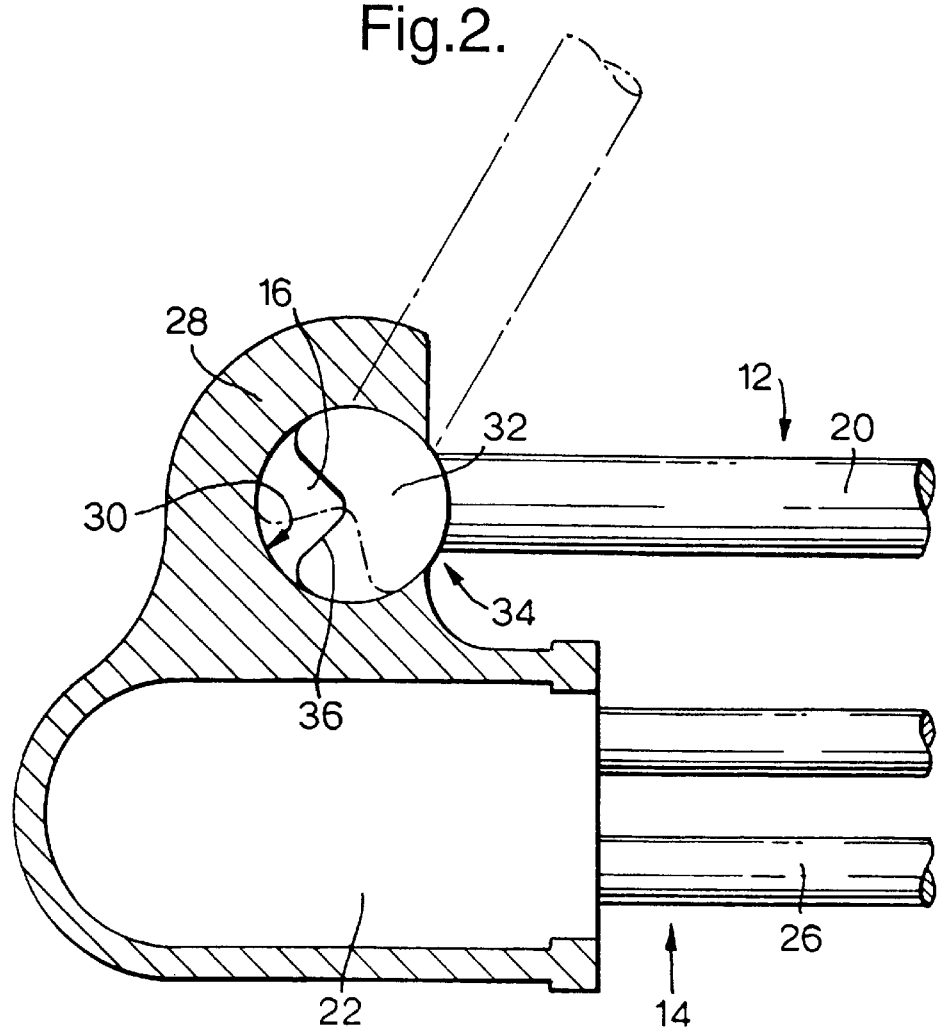

US 6,615,604 B2

ASSEMBLY OF A COMPONENT OF A VEHICLE AIR CONDITIONING SYSTEM TO A SUPPORT STRUCTURE

TECHNICAL FIELD

The present invention relates to an assembly of a component of a vehicle air conditioning system to a support structure, and more particularly to an assembly of a condenser to a radiator.

BACKGROUND OF THE INVENTION

A condenser of a vehicle air conditioning system comprises two condenser tanks with flow tubes arranged therebetween. Similarly, a radiator comprises two radiator tanks with flow tubes arranged therebetween. Such a condenser is mounted in a generally parallel plane in front of a radiator by fitting the condenser tanks to the radiator tanks.

In a typical prior art assembly, the condenser tank comprises upper and lower wing tabs at its upper and lower edges. These wing tabs are provided with mounting holes, through which fasteners, such as screws, are inserted in order to attach the wing tabs to a bracket mounted on the radiator tank. The installation process for the condenser hence comprises fitting the brackets to the radiator tanks, fitting the wing tabs to the condenser tanks, aligning the condenser such that the mounting holes of the wing tabs align with corresponding holes in the brackets. Fasteners, such as screws are inserted through the upper wing tabs in order to initially retain the condenser in its position. Screws are then inserted through the lower wing tabs and tightened. Finally the screws through the upper wing tabs are tightened in order to complete the assembly.

It is clear that such an installation process is a relatively tedious and time-consuming process. Furthermore, the brackets, wing tabs and screws add to the weight of the condenser-radiator assembly and hence to the overall weight of the vehicle. Weight reduction is however a major concern for manufacturers. Indeed, the latter try to reduce the weight of their vehicles wherever they can, as a reduced weight entails a better efficiency of the vehicle. Even a very small weight reduction in one particular assembly can be of importance as many small weight reductions add up to a considerable weight reduction. Finally, the above-mentioned assembly is not able to accommodate for manufacturing tolerances of the radiator and/or the condenser. If the mounting holes cannot be aligned, then either the condenser must be matched with another radiator or reworked.

SUMMARY OF THE INVENTION

The object of the present invention is hence to provide an assembly of a component of a vehicle air conditioning system to a support structure, wherein the component can easily and quickly be fitted to the support structure and wherein the number of parts can be reduced.

In order to overcome the abovementioned problems, the present invention proposes an assembly of a component of a vehicle air conditioning system to a support structure, wherein the component has a first connection element and the support structure has a second connection element. According to an important aspect of the invention, either the first or the second connection element comprises a recess therein for receiving the other connection element and a lateral opening for allowing lateral introduction of the other connection element into the recess. The other connection element comprises a form having a section adapted to be received in the recess, the section having a dimension in a first direction which is smaller than the width of the lateral opening and the section having a dimension in a second direction which is larger than the width of the lateral opening, such that, in a first position, the other connection element can be introduced into the recess through the lateral opening and that, after rotation of the other connection element within the recess into a second position, an interference fit connection is achieved between the first connection element and the second connection element.

Such an assembly allows an easy and quick connection of a component to a support structure. Furthermore, apart form the first connection element and the second connection element, there are no additional parts needed, there is hence an overall weight reduction of the assembly.

The recess can be formed in the first connection element, in which case, the second connection element is adapted to be received in the recess. Preferably however, the recess is formed in the second connection element, in which case, the first connection element is adapted to be received in the recess. In order to fix the component to the support structure, the first connection element is introduced into the recess of the second connection element through the lateral opening. The first connection element is then rotated from a first rotational position—the introduction position—to a second rotational position, in which an interference fit connection between the first and second connection elements is achieved. The component is hence securely connected to the support structure. The connection is achieved simply by rotation of the first connection element in the second connection element; i.e. no screws or other fastening means are necessary.

Preferably, the section of the first connection element is generally the same as the section of the recess, the section of the first connection element comprising a deformation in order to obtain the dimension in the first direction. The first connection element hence snugly fits in the recess, whereby a strong assembly is obtained. The deformation ensures that the first connection element can be introduced through the lateral opening of the second connection element into the recess.

The recess, and preferably also the first connection element can be of generally circular cross-section. In such a case, the outer diameter of the first connection element is advantageously substantially equal to the inner diameter of the recess.

The deformation of the first connection element can e.g. be a local flattening of the cross-section or a cut-out.

According to an embodiment of the invention, the component comprises an elongate first connection end having one or more first connection elements mounted thereon, and the support structure comprises an elongate first connection end having one or more second connection elements mounted thereon, wherein the first and second connection elements are mounted on the first connection ends so as to able to engage in each other. By providing more than one connection elements along an elongate connection end, a more rigid assembly is obtained. There could e.g. be one connection element at each end portion of such an elongate connection end.

Advantageously, the first connection element is integrally formed with the first connection end of the component, and the second connection element is integrally formed with the first connection end of the support structure. The assembly is thereby simplified, as no connection elements need to be fixed to the connection ends. Assembly time is thereby also reduced.

Preferably, the first connection element and the first connection end of the component are made of synthetic material, which allows for an easy manufacture of the first connection end with integrated first connection elements. The first connection end and the first connection element can e.g. be formed by moulding processes. For the same reason, the second connection element and the first connection end of the support structure are preferably made of synthetic material.

According to a preferred embodiment of the invention, both the component and the support structure each comprise an elongate second connection end, wherein the assembly comprises connection means for connecting the second connection end of the component to the second connection end of the support structure. The assembly thereby becomes more rigid. The rotation of the first connection element within the recess of the second connection element is prevented by securing the second connection end of the component to the second connection end of the support structure.

The connection means can be any means like e.g. screw means, but preferably, the connection means are clip means. Such clip means can be designed so as to reach over the second connection end of the component in order to maintain the latter in place.

According to a preferred embodiment of the invention, the clip means are slideably mounted in a guide. This allows to further simplify the assembly of the component to the support structure. The clip is engaged in the guide and maintained therein. As the clip is pushed over the second connection end of the component, it secures the latter to the support structure. The slideable clip does not only provide an easy connection means, it also provides means for compensating manufacturing tolerances of either or both the component and the support structure. The manufacturing precision hence plays a less important role. No time is lost during the assembly by having to try and compensate for the tolerance or by having to try and find a component that matches the supporting structure. Furthermore, the slideable clip allows the component to contract or expand freely with respect to the support structure.

The guide is preferably integrally formed with the second connection end of the support structure.

The support structure is preferably a vehicle radiator.

The component of a vehicle air conditioning system can e.g. be a condenser, a fan shroud, a charge air cooler or an air-oil cooler.

BRIEF DESCRIPTION OF THE DRAWINGS

The present invention will be more apparent from the following description of a not limiting embodiment with reference to the attached drawings, wherein FIG. 1 shows a section view through an assembly of a condenser to a radiator according to the invention;

FIG. 2 shows a section view through the first condenser tank and the first radiator tank of FIG. 1;

DESCRIPTION OF THE PREFERRED EMBODIMENT

Figure 3:
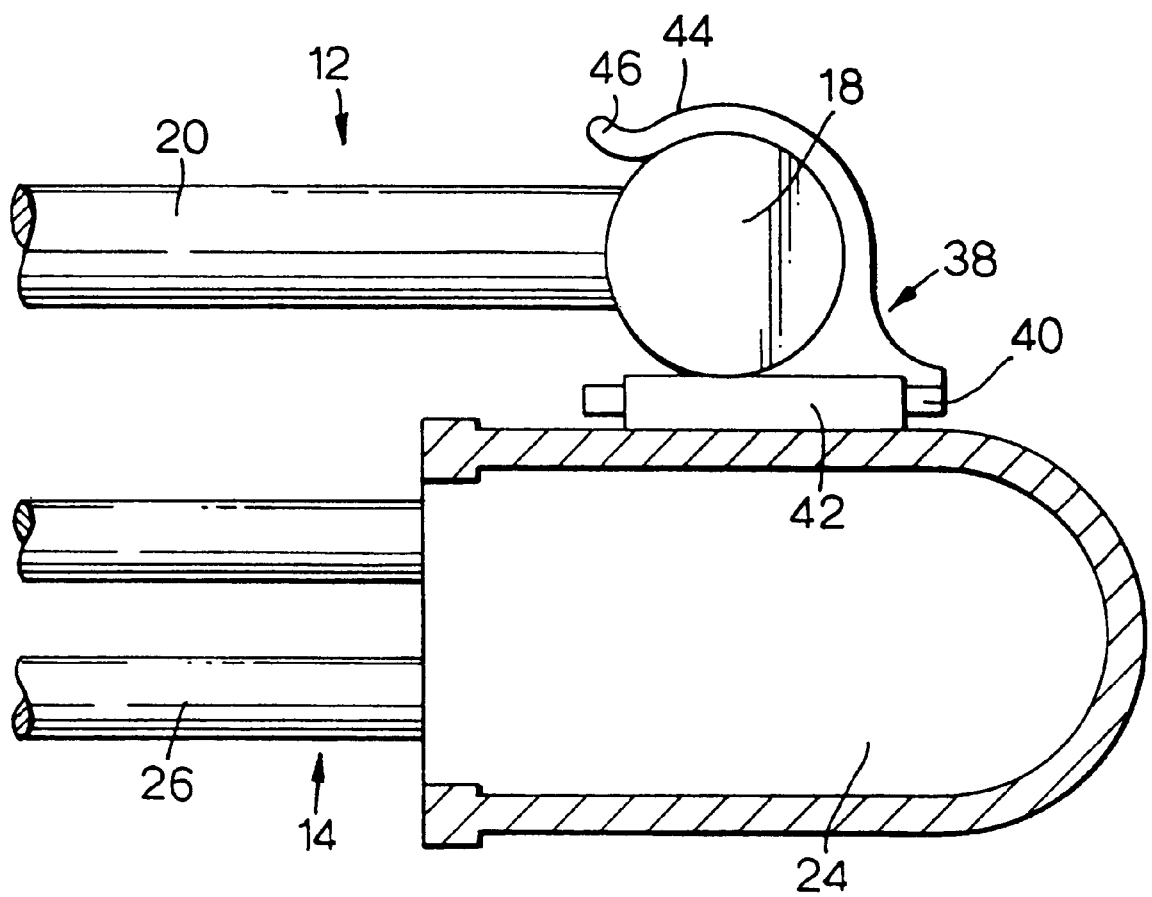
FIG. 3 shows a section view through the second condenser tank and the second radiator tank of FIG. 1.

FIG. 1 shows an assembly 10 of a condenser 12 to a radiator 14. The condenser 12 comprises a first condenser tank 16 and a second condenser tank 18, with flow tubes 20 arranged therebetween. The radiator 14 comprises a first radiator tank 22 and a second radiator tank 24, with flow tubes 26 arranged therebetween.

The first condenser tank 16 comprises a first connection element at each end for engaging with a second connection element on the first radiator tank 22. The second connection element is a bracket 28 integrally moulded with the first radiator tank 22. The bracket 28 has a recess 30 with a generally circular cross-section therein for receiving the first connection element, i.e. a deformed end portion 32 of the first condenser tank 16. The end portion 32 of the first condenser tank 16 generally has the same cross-section as the recess 30 of the bracket 28 so that the end portion 32 is snugly received in the recess 20.

The connection between the first condenser tank 16 and the first radiator tank 22 can be more closely described by referring to FIG. 2, which shows a section view through one connection end of the radiator-condenser assembly 10.

The first radiator tank 22 comprises two axially spaced brackets 28 (only one of which is shown in the figures) arranged so as to be capable of receiving the two end portions 32 of the first condenser tank 16. These brackets 28 are preferably integrally formed with the wall of the first radiator tank 22. The recess 30 of the bracket 28 has a generally circular cross-section. The bracket 28 further has a lateral opening 34 for enabling the end portion 32 of the first condenser tank 16 to be laterally introduced into the recess 30. As can be seen on FIG. 2, the lateral opening 34 is smaller than half the circumference of the recess 30, such that, once the end portion 32 is received in the recess and rotated therein, it cannot escape therefrom.

The section of the end portion 32 of the first condenser tank 16 has a dimension in a first direction, which is smaller than the width of the lateral opening 34, and a dimension in a second direction, which is larger than the width of the lateral opening 34. The smaller dimension of the section can be obtained by a radial deformation 36 of the end portion 32 of the first condenser tank 16.

In order to introduce the first connection element into the recess of the second connection element, i.e. in order to introduce the end portion 32 of the first condenser tank 16 into the recess 30 of the bracket 28 mounted on the first radiator tank 22, the condenser 12 is held substantially perpendicular to the radiator 14 (this position of the condenser 12 is indicated in dotted lines on FIG. 2), so that the deformed end portion 32 of the first condenser tank 16 can be introduced into the recess 30 of the bracket 28 through the lateral opening 34. Once the end portion 32 is received in the recess 30, it is rotated within the recess 30 until the condenser 12 lies in a plane, which is generally parallel to the plane of the radiator 14. The radial deformation 36 of the end portion 32 now lies opposite the lateral opening 34, and the large dimension of the end portion 32 prevents the latter from escaping from the recess 30. The end portion 32 of the condenser tank 16 is hence maintained in the bracket 28; only rotation of the condenser 12 around the axis of the first condenser tank 16 is still possible.

In order to prevent the rotation of the condenser 12 around the axis of the first condenser tank 16, the second condenser tank 18 is attached to the second radiator tank 24. The second condenser tank 18 can be secured to the second radiator tank 24 by means of screws or any other fastening means. Preferably however the connection means used for securing the second condenser tank 18 to the second radiator tank 24 comprises clip means 38.

Figure 4:
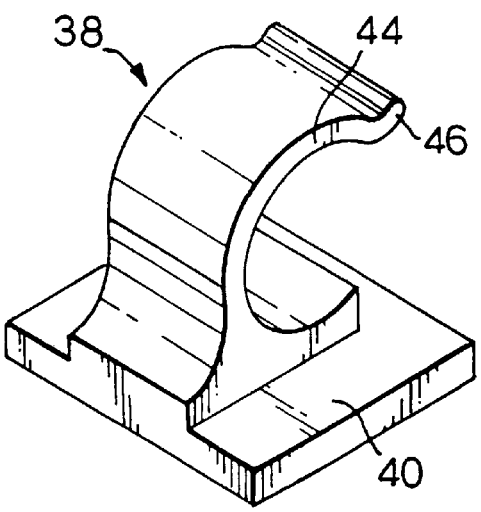
FIG. 4 shows a perspective view of the clip of FIG. 3.
Figure 5:
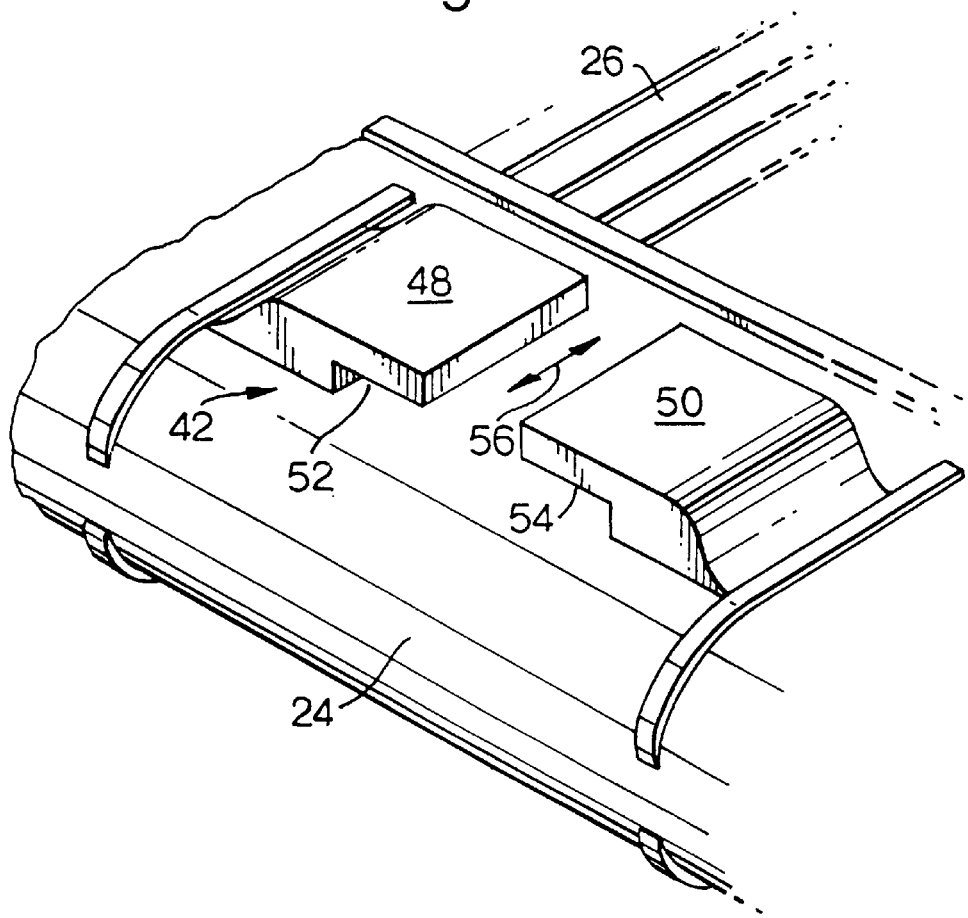
FIG. 5 shows a perspective view of the second radiator tank of FIG. 3.

The connection between the second condenser tank 18 and the second radiator tank 24 can be more closely described by referring to FIG. 3, which shows a section view through the second connection end of the radiator-condenser assembly 10. The clip 38 and en end portion of the second radiator tank 24 can also be seen in perspective view on FIG. 4 and FIG. 5.

The clip 38 comprises a widened base portion 40, which is received in a guide 42 for sliding therein. The clip 38 comprises a clip arm 44 reaching over the second condenser tank 18 and maintaining the latter against the second radiator tank 24. In order to facilitate the sliding of the clip arm 44 over the second condenser tank 18, the front end 46 of the arm clip 44 is bent upwards.

The guide 42 is integrally formed with the second connection end 24 and comprises two guide parts 48, 50. The latter are arranged such that there is an opening therebetween for receiving the clip 38. The guide parts 48, 50 further comprise a channel 52, 54 for receiving the widened base portion 40 of the clip 38. When fitted, the clip 38 can slide back and forth within the guide 42, as indicated by arrow 56.

Such a slideable clip 38 allows to quickly and simply connect the second condenser tank 18 to the second radiator tank 24, whereby rotation of the condenser 12 around the axis of the first condenser tank 16 is prevented. Furthermore, such a slideable clip 38 also allows to compensate for manufacturing tolerances of the condenser 12 and the radiator 14. Finally, the slideable clip 38 also allows the thermal expansion and contraction of the condenser 12 with respect to the radiator 14.

It will be understood that, although this description deals with an assembly of a condenser to a radiator, other components of a vehicle air conditioning system, like e.g. fan shroud, a charge air cooler or air-oil cooler, can be mounted on a radiator or any other support structure in the same way.

What is claimed is:

1. Assembly of a component (12) of a vehicle air conditioning system to a support structure (14), said component (12) having a first connection element (32), and said support structure (14) having a second connection element (28), characterised in that
    either said first connection element (32) or said second connection element (28) comprises a recess (30) therein for receiving the other connection element (28, 32), and a lateral opening (34) for allowing lateral introduction of said other connection element (28, 32) into said recess (30),
    said other connection element (28, 32) comprises a form having a section adapted to be received in said recess (30), said section having a dimension in a first direction which is smaller than the width of said lateral opening (34) and said section having a dimension in a second direction which is larger than the width of said lateral opening (34), such that, in a first position, said other connection element (28, 32) can be introduced into said recess (30) through said lateral opening (34) and that, after rotation into a second position of said other connection element (28, 32) within said recess (30), an interference fit connection is achieved between said first connection element (32) and said second connection element (28).

2. Assembly according to claim 1, wherein said recess (30) is formed in said first connection element (32).

3. Assembly according to claim 1, wherein said recess (30) is formed in said second connection element (28).

4. Assembly according to claim 3 wherein said section of said first connection element (32) is generally the same as the section of said recess (30), said section of said first connection element (32) comprising a deformation (36) in order to obtain said dimension in said first direction.

5. Assembly according to any of claims 3 to 4, wherein said recess (30) is of generally circular cross-section.

6. Assembly according to any of claim 5, wherein said first connection element (32) is of generally circular cross-section.

7. Assembly according to claim 6, wherein the outer diameter of said first connection element (32) is substantially equal to the inner diameter of said recess (30).

8. Assembly according to claim 7, wherein said deformation (36) of said first connection element (32) is a local flattening of said cross-section.

9. Assembly according to claim 7, wherein said deformation (36) of said first connection element (32) is a cut-out.

10. Assembly according to claim 9, wherein said component (12) comprises an elongate first connection end (16) having one or more first connection elements (32) mounted thereon,
    said support structure (14) comprises an elongate first connection end (22) having one or more second connection elements (28) mounted thereon,
    said first and second connection elements (28) being mounted on said first connection ends (16, 22) so as to able co engage in each other.

11. Assembly according to claim 10, wherein
    said first connection element (32) is integrally formed with said first connection end (16) of said component (12), and
    said second connection element (28) is integrally formed with said second connection end (22) of said support structure (14).

12. Assembly according to claim 11, wherein said first connection element (32) and said first connection end (16) of said component (12) are made of synthetic material.

13. Assembly according to claim 12, wherein said second connection element (28) and said first connection end (22) of said support structure (14) are made of synthetic material.

14. Assembly according to claim 13, wherein
    said component (12) comprises an elongate second connection end (18)
    said support structure (14) comprises an elongate second connection end (24)
    said assembly comprises connection means (38) for connecting said second connection end (18) of said component (12) to said second connection end (24) of said support structure (14).

15. Assembly according to claim 14, wherein said connection means (38) are screw means.

16. Assembly according to claim 14, wherein said connection means (38) are clip means.

17. Assembly according to claim 16, wherein said clip means (38) are slideably mounted in a guide (42).

18. Assembly according to claim 17, wherein said guide (42) is integrally formed with said second connection end (24) of said support structure (14).

19. Assembly according to claim 18, wherein said support structure (14) is a vehicle radiator.

20. Assembly according to claim 19, wherein said component (12) of a vehicle air conditioning system is a condenser, a fan shroud, a charge air cooler or an air-oil cooler.

* * * * *